United States Patent [19]
Wolverton

[11] 3,990,692
[45] Nov. 9, 1976

[54] ARTICLE POSITIONING APPARATUS

[75] Inventor: Philip Wolever Wolverton, Marion, Ind.

[73] Assignee: RCA Corporation, New York, N.Y.

[22] Filed: Sept. 30, 1975

[21] Appl. No.: 618,245

[52] U.S. Cl. .............................. 269/266; 269/321 T
[51] Int. Cl.[2] .......................................... B25B 1/24
[58] Field of Search ................ 269/321 T, 266, 265, 269/287

[56] References Cited
UNITED STATES PATENTS

| | | | |
|---|---|---|---|
| 1,369,454 | 2/1921 | Mathy ............................. | 269/321 T |
| 2,486,494 | 11/1949 | Rice ................................... | 269/266 |
| 2,792,810 | 5/1957 | Maconeghy et al. ............ | 269/321 T |
| 3,322,456 | 5/1967 | Strakhal et al. ................... | 269/266 |
| 3,385,592 | 5/1968 | Hasell et al. ...................... | 269/287 |
| 3,806,108 | 4/1974 | Adachi et al. .................... | 269/321 T |

Primary Examiner—Al Lawrence Smith
Assistant Examiner—Robert C. Watson
Attorney, Agent, or Firm—Glenn H. Bruestle; William H. Murray

[57] ABSTRACT

Three locator assemblies and an article support are attached to a C-shaped frame. Each locator assembly comprises at least two pivoted and one fixed finger-shaped locators for engaging locating surfaces on the article to be positioned, e.g., a funnel portion of a television picture tube. Different size articles can be positioned, with the fixed locators engaing locating surfaces on the largest article and corresponding sets of pivoted locators engaging locating surfaces on smaller size articles. Insertion of the largest article causes all pivoted locators to pivot from an engaging position to a non-interfering standby position. Insertion of the next largest article causes some pivoted locators to pivot while the others engage the locating surfaces. Insertion of the smallest article causes no pivoting of the locators. The article support positions the different size inserted articles such that each locating surface is substantially opposite a corresponding locator.

10 Claims, 8 Drawing Figures

ARTICLE POSITIONING APPARATUS

BACKGROUND OF THE INVENTION

This invention relates to an apparatus for positioning various sized articles and particularly to an apparatus for positioning television picture tubes.

At various points in the manufacturing cycle of television picture tubes, it is necessary to accurately position the tube, or various components thereof, to enable the performance of various assembly operations. An example of an operation of this type is where it is necessary to mount a funnel ring on the funnel portion of the television picture tube. This step in the manufacturing cycle occurs regardless of the size of the television picture tube being assembled.

When positioning different sized television picture tubes, it is customary to design and build a special positioning fixture for each different size tube. As a result, each time a different size tube is positioned on a machine, a corresponding positioning picture must be first installed and aligned with respect to the machine. For an assembly plant which manufactures four or five different size television picture tubes, this refixturing for each different size becomes an expensive and time-consuming operation.

SUMMARY OF THE INVENTION

An apparatus for positioning articles of at least two different sizes, each size article having at least three locating points defining a reference plane. The positioning apparatus comprises a frame having an opening therein and means for supporting the articles to be positioned such that the reference plane of each size article is maintained at a predetermined position with respect to the frame. At least three locator assemblies are mounted on the frame around the periphery of the opening therein in predetermined spaced relation to each other. Each locator assembly comprises at least two locators, at least one of which is moveable to a non-interfering standby position. The moveable locator of each locator assembly lies in the same plane and is adapted to engage a locating point on the smallest size article to be positioned. The other locator of each locator assembly lies in a plane different from that of the moveable locators and is adapted to engage a locating point of a larger size article to be positioned.

DETAILED DESCRIPTION

Figure 1:
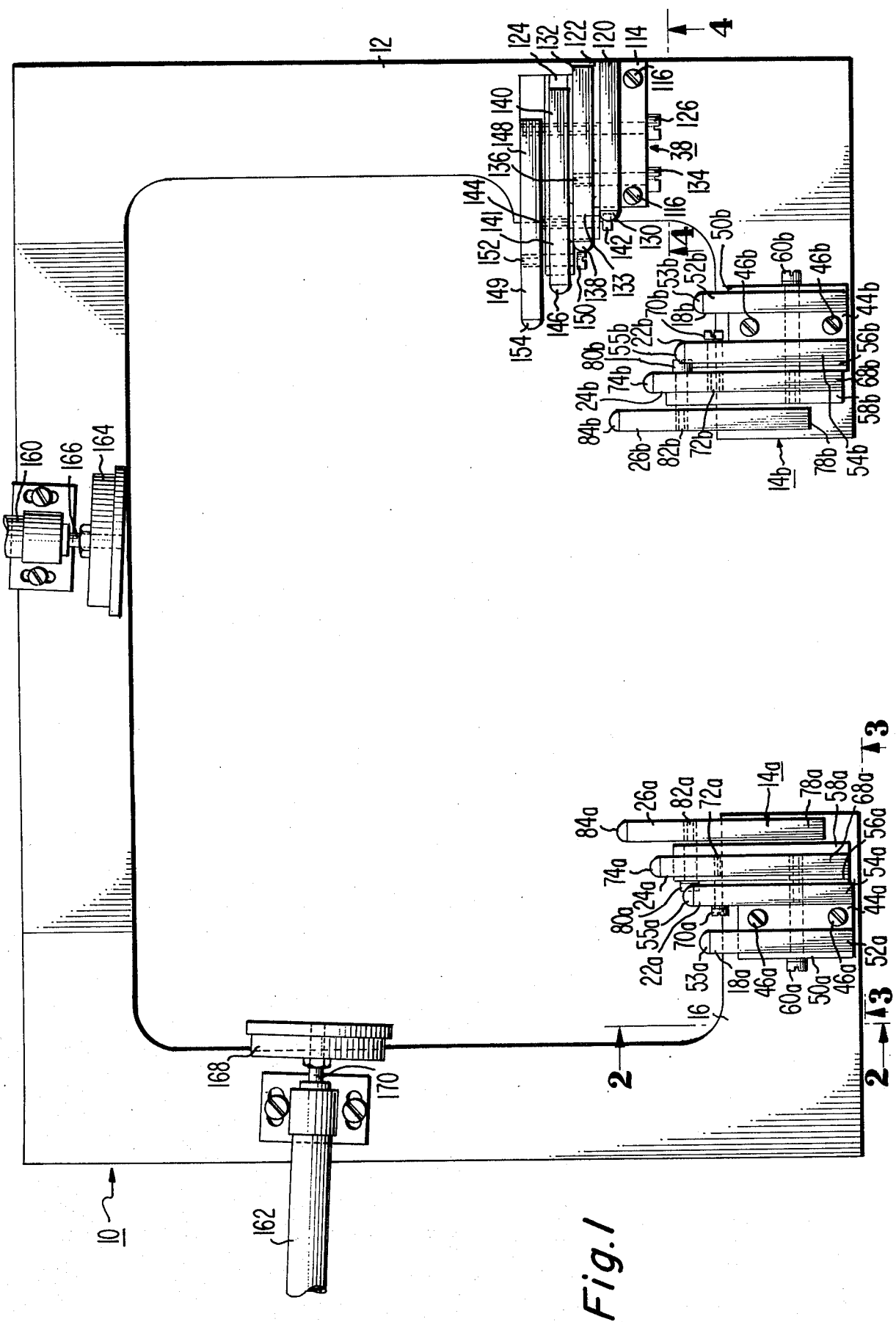
FIG. 1 is a top plan view of an article positioning apparatus of the present invention.

In FIG. 1 there is shown a preferred embodiment of an article positioning apparatus of the present invention, generally referred to as 10. The article positioning apparatus 10 includes a frame 12 comprising a substantially flat, rectangular plate having a substantially rectangular opening in the center and an opening through one side thereof such that the resultant flame 12 has a substantially C-shaped structure.

A first locator assembly, generally referred to as 14a, and a second locator assembly, generally referred to as 14b, are mounted on the upper surface 16 of the frame 12 adjacent opposite sides of the side opening therein. A third locator assembly, generally referred to as 38, is mounted on the upper surface 16 adjacent the second locator assembly 14b. The exact positions of the first, second and third locator assemblies 14a, 14b and 38 on the frame 12 is dependent upon the location of the reference surfaces on the article to be positioned as will hereinafter be described.

Figure 2:
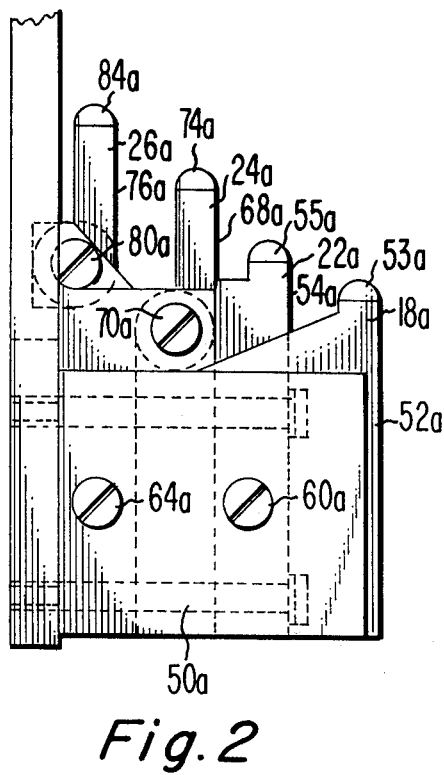
FIG. 2 is a sectional view taken along line 2—2 of FIG. 1.
Figure 3:
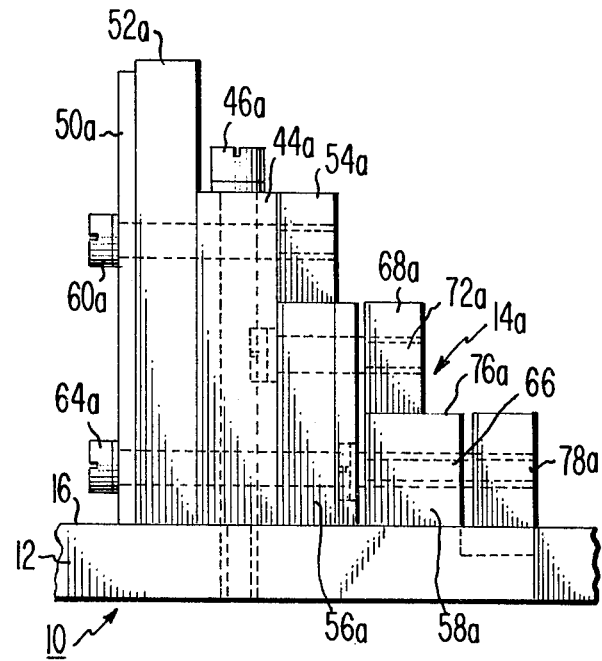
FIG. 3 is a sectional view taken along line 3—3 of FIG. 1.

As shown in FIG. 1, the first and second locator assemblies 14a and 14b are substantially mirror images, with the components of one corresponding to the components of the other. Consequently, for purposes of clarity, the description of the first and second locator assemblies 14a and 14b will use the same reference number to designate corresponding components, with the letter $a$ designating a component of the first locator assembly 14a and the letter $b$ designating the corresponding component of the second locator assembly 14b. Referring to FIGS. 1, 2 and 3, the first and second locator assemblies 14a and 14b each include a mounting block 44a and 44b respectively. Each mounting block 44a and 44b is mounted on the upper surface 16 of the frame 12 using, for example, a pair of threaded bolts 46a and 46b respectively which are screwed into tapped holes (not shown) in the frame 12.

A back-up plate 50a and 50b is positioned adjacent a first fixed locator 52a and 52b respectively which is in turn positioned adjacent one side of the mounting block 44a and 44b. Each first fixed locator 52a and 52b has an elongated member 18a and 18b protruding therefrom, toward the center opening, with a hemispherical engaging pad 53a and 53b at the end thereof. A second fixed locator 54a and 54b having a finger-like structure 22a and 22b with a hemispherical engaging pad 55a and 55b at one end thereof, is positioned on a first pivot block 56a and 56b, both of which are in turn positioned adjacent another side of the mounting block 44a and 44b. A second pivot block 58a and 58b is positioned adjacent the first pivot block 56a and 56b respectively. The back-up plate 50a and 50b, the first and second fixed locators 52a, b and 54a, b, as well as the first and second blocks 55a, b and 58a, b pivot, are rigidly attached to the mounting block 44a and 44b using, for example, a first threaded bolt 60a and 60b and a second threaded bolt 64a and 64b (see FIGS. 2 and 3). The shaft of the first bolt 60a and 60b passes through the back-up plate 50a and 50b, the first fixed locator 52a and 52b, the mounting block 44a and 44b and is screwed into a tapped hole (not shown) in the second fixed locator 54a and 54b. The shaft of the second bolt 64a and 64b passes through the back-up plate 50a and 50b, the first fixed locator 52a and 52b, the mounting block 44a and 44b, the first pivot block 56a and 56b and is screwed into a tapped hole (not shown) in the second pivot block 58a and 58b.

A first pivoted locator 68a and 68b pivotally attached to the first pivot block 56a and 56b respectively using, for example, a shoulder screw 70a and 70b, (see FIGS. 1 and 2) the shaft of which passes through the first pivot block 56a and 56b and is screwed into a tapped hole 72a and 72b in the first pivoted locator 68a and 68b. The first pivoted locator 68a and 68b has a finger-like structure 24a and 24b with a hemispherical engaging pad 74a and 74b at one end thereof. The pivot point, which coincides with the tapped hole 72a and 72b, is located closer to the engaging pad 74a and 74b than to the opposite end of the finger-like structure thereby creating a counter balance effect such that the end of the finger-like structure opposite the engaging pad 74a and 74b normally rests, under the influence of gravity, against an upper surface 76a and 76b (see FIG. 3) of the second pivot block 58a and 58b which acts as a rotation limit stop. This resting position will hereinafter be referred to as the engaging position. The engaging position is the position illustrated in FIGS. 1, 2 and 3.

A second pivoted locator 78a and 79b is pivotally attached to the second pivot block 58a and 58b using, for example, a shoulder screw 80a and 80b (see FIGS. 1 and 2), the shaft of which passes through the second pivot 58a and 58b and is screwed into a tapped hole 82a and 82b in the second pivoted locator 78a and 78b. The second pivoted locator 78a and 78b has a finger-like structure 26a and 26b with a hemispherical engaging pad 84a and 84b at one end thereof. The pivot point, which coincides with the tapped hole 82a and 82b is located closer to the engaging pad 84a and 84b than to the opposite end of the finger-like structure thereby creating a counter balance effect such that the end of the finger-like structure opposite the engaging pad 84a and 84b normally rests, under the influence of gravity, against the upper surface 16 of the frame 12 which acts as a rotation limit stop.

Figure 4:
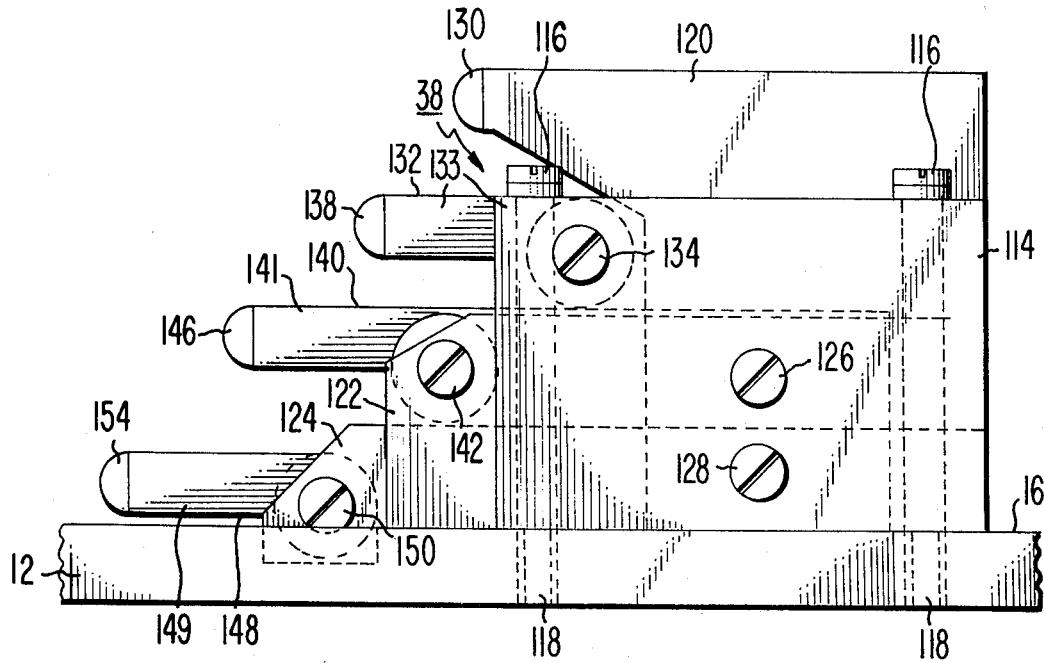
FIG. 4 is a sectional view taken along line 4—4 of FIG. 1.

The third locator assembly 38, as shown in FIGS. 1 and 4, comprises a mounting block 114 which is mounted on the upper surface 16 of the frame 12 using, for example, two threaded bolts 116 which are screwed into two tapped holes 118 in the fraame 12. A fixed locator 120, a first pivot block 122 and a second pivot block 124 are positioned in contact with the upper surface 16 of the frame 12 and are attached to one side of the mounting block 114 using, for example, a first threaded bolt 126 and a second threaded bolt 128. The shaft of the first threaded bolt 126 passes through the mounting block 114, the fixed locator 120 and screws into a threaded hole in the first pivot block 122. The shaft of the second threaded bolt 128 passes through the mounting block 114, the fixed locator 120, the first pivot block 122 and screws into a threaded hole in the second pivot block 124. The fixed locator 120 has an elongated member protruding therefrom with a hemispherical engaging pad 130 at the end thereof.

A first pivoted locator 132 is pivotally attached to the mounting block 114 using, for example, a shoulder screw 134, the shaft of which passes through the mounting block 114 and is screwed into a tapped hole 136 (see FIG. 1) in the first pivoted locator 132. The first pivoted locator 132 has a finger-like structure 133 with a hemispherical engaging pad 138 at one end thereof. The pivot point, which coincides with the tapped hole 136, is located closer to the engaging pad 138 then to the opposite end of the finger-like structure thereby creating a counter balance effect such that the end of the finger-like structure opposite the engaging pad 138 normally rests, under the influence of gravity, against an upper surface of the first pivot block 122 which acts as a rotation limit stop.

A second pivoted locator 140 is pivotally attached to the first pivot block 122 using, for example, a shoulder screw 142, the shaft of which passes through the first pivot block 122 and is screwed into a tapped hole 144 (see FIG. 1) in the second pivoted locator 140. The second pivoted locator 140 has a finger-like structure 141 with a hemispherical engaging pad 146 at one end thereof. The second pivoted locator 140 is counter balanced like the first pivoted locator such that the end of the finger-like structure opposite the engaging pad 146 normally rests against an upper surface of the second pivot block 124 which acts as a rotation limit stop.

A third pivoted locator 148 is pivotally attached to the second pivot block 124 using, for example, a shoulder screw 150, the shaft of which passes through the second pivot block 124 and is screwed into a tapped hole 152 (see FIG. 1) in the third pivoted locator 148. The third pivoted locator 148 has a finger-like structure 149 with a hemispherical engaging pad 154 at one end thereof. Like the first 132 and second 140 pivoted locators, the third pivoted locator 148 is counterbalanced with the end of the finger-like structure opposite the engaging pad 154 normally resting against the upper surface 16 of the frame 12 which acts as a rotation limit stop.

A first plane is defined by the engaging pad 53(a) of the first fixed locator 52(a in the first locator assembly 14(a), the engaging pad 53(b) of the first fixed locator 52(b) in the second locator assembly 14(b), and the engaging pad 130 of the fixed locator 120 in the third locator assembly 38. A second plane, defined by the engaging pad 55(a) of the second fixed locator 54(a), the engaging pad 55(b) of the second fixed locator 54(b), and the engaging pad 138 of the first pivoted locator 132 in the first 14(a), second 14(b) and third 38 locator assemblies respectively, is spaced below and is substantially parallel to the first plane. A third plane, defined by the engaging pad 74(a) of the first pivoted locator 68(a) in the first locator assembly 14(a), the engaging pad 74(b) of the first pivoted locator 68(b) in the second locator assembly 14(b), and the engaging pad 146 of the second pivoted locator 140 in the third locator assembly 38, is spaced below and is substantially parallel to the second plane. A fourth plane, defined by the engaging pad 84(a) of the second pivoted locator 78(a), the engaging pad 84(b) of the second pivoted locator 78(b) and the engaging pad 154 of the third pivoted locator 148 in the first 14(a), second 14(b) and third 38 locator assemblies respectively, is spaced below and is substantially parallel to the third plane.

Engaging means, comprising a first pneumatic cylinder 160 and a second pneumatic cylinder 162, are mounted on the upper surface 16 of the frame 12 as shown in FIG. 1. The first pneumatic cylinder 160 includes a clamping pad 164 mounted at one end of a connecting rod 166. The first pneumatic cylinder 160 is mounted opposite the first 14(a) and second 14(b)

locator assemblies with the clamping pad 164 positioned substantially adjacent the edge of the center opening in the frame 12. The second pneumatic cylinder 162 includes a clamping pad 168 mounted at one end of a connecting rod 170. The second pneumatic cylinder 162 is mounted substantially opposite the third locator assembly 38 with the clamping pad 168 positioned substantially adjacent the edge of the center opening in the frame 12.

Figure 5:
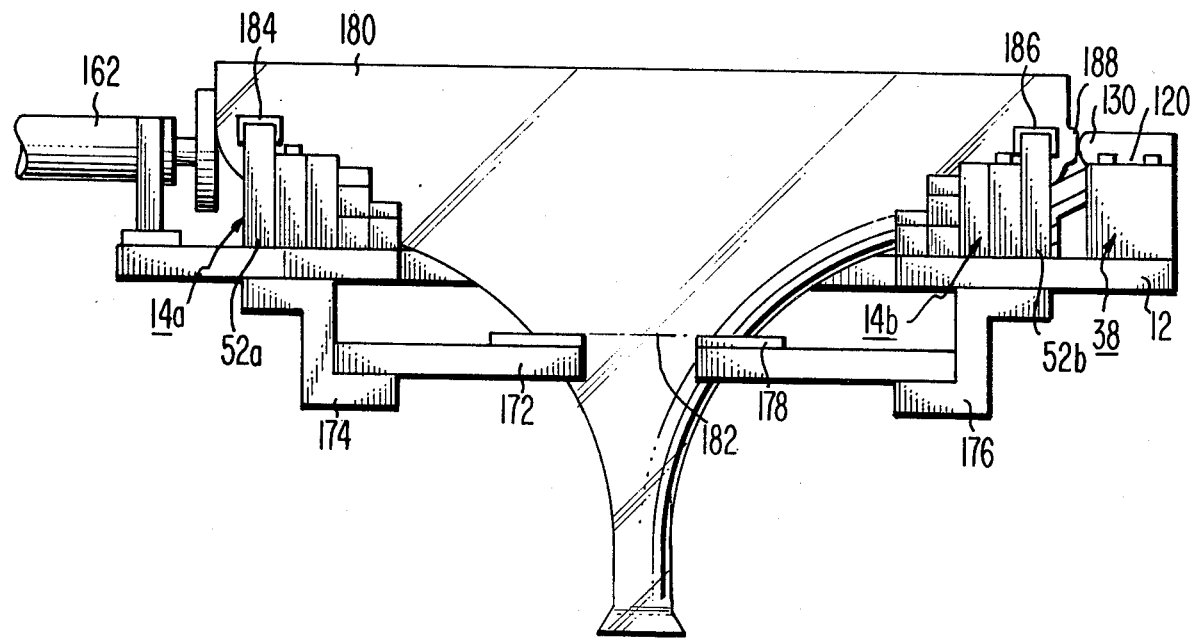
FIG. 5 is a side elevational view of the article positioning apparatus showing a funnel portion of a television picture tube inserted therein.

As shown in FIG. 5, support means, including a support frame 172, is positioned in a predetermined, fixed spaced relation to the frame 12 by a pair of brackets 174 and 176. The support frame 172 comprises a substantially flat rectangular plate having a substantially circular opening in the center and an opening through one side thereof such that the resultant support frame 172 is substantially C shaped. A substantially C-shaped support gasket 178 is mounted on an upper surface of a support frame 172 with the side opening of the support gasket 178 in substantial alignment with the side opening of the support frame 172.

As shown in FIG. 1, the hemispherical engaging pads of the locators extend, for different lengths, out over the center opening in the frame 12 so that they are in a position to engage reference surfaces on the article to be positioned. The length of extension over the center opening depends upon the relative sizes of the articles to be positioned. The pads extending the shortest distance will engage reference surfaces on the largest article to be positioned while those extending the longest distance will engage the reference surfaces on the smallest article.

The following is an example of how the device of the present invention is used to position a funnel portion of a television picture tube. As shown in FIG. 5, the funnel portion 180 of a television picture tube is inserted in the center openings of the frame 12, the supporot frame 172 and the support gasket 178 through the respective side openings therein if desired. The interior circumference of the support gasket 178 is dimensioned such that it is substantially equal to a circumference of the funnel portion known as the yoke reference line (indicated by the dashed line 182). Consequently, the tube is supported in a vertical orientation by the support gasket 178 at the yoke reference line 182. The funnel portion 180 has three reference pads, an A pad 184, a B pad 186 and a C pad 188, positioned thereon. The three reference pads define a plane which is substantially parallel to the plane of the yoke reference line 182. It should be noted that the funnel portion 180 can be vertically supported at any circumference of the funnel portion lying in a plane which is substantially parallel to the plane of the reference pads.

As shown in FIG. 5, the funnel portion 180 is supported by the support gasket 178 and the support frame 172 such that the first plane defined by the engaging pad is substantially coincident with the plane defined by the reference pads on the funnel. The horizontal position of the three locator assemblies are initially adjusted, using a set-up gauge (not shown) such that the engaging pad 53(a) (see FIG. 1) of the first fixed locator 52(a) in the first locator assembly 14(a), is substantially opposite the A pad 184. Similarly, the engaging pad 53(b) (see FIG. 1) of the first fixed locator 52(b) in the second locator assembly 14(b) is substantially opposite the B pad 186. Also, the engaging pad 130 of the fixed locator 120 of the third locator assembly 38 is substantially opposite the C pad 188.

The first pneumatic cylinder 160 (see FIG. 1) and the second pneumatic cylinder 162 are pressurized causing their respective clamping pads 164 and 168 to exert lateral pressure against the funnel 180. This ensures proper lateral position of the funnel 180 by forcing the reference pads into contact with their respective engaging pads. The funnel position 180 is now properly positioned.

Figure 6:
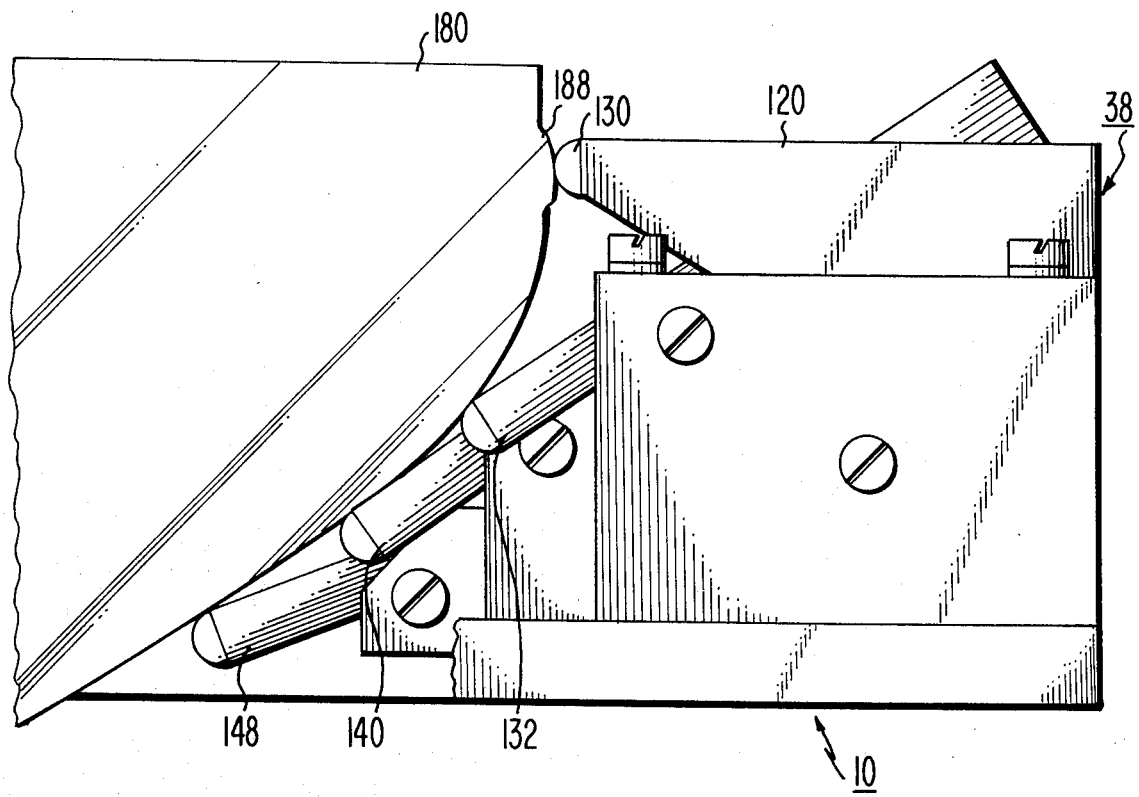
FIG. 6 is a side elevational view of a portion of the article positioning apparatus showing the relationship of the largest funnel portion to the third locator assembly, when inserted in the positioning apparatus of the present invention.

FIG. 6 shows the configuration of a locator assembly, for example the third locator assembly 38, when the largest size funnel 180 is inserted in the article positioning apparatus 10 of the present invention (see FIG. 5). As shown in FIG. 6, the reference pad 188 of the funnel portion 180 engages the engaging pad 130 of the fixed locator 120 in the third locator assembly 38. The reference pad 188 is held against the engaging pad 130 by the second pneumatic cylinder 162 (see FIG. 5). In addition, insertion of the largest size funnel 180 causes the first, second and third pivoted locators 132, 140 and 148 respectively, to pivot from their respective engaging positions as shown in FIG. 4 to non-interfering standby positions as shown in FIG. 6. Due to the counter-balanced construction of the pivoted locators, they will return to the engaging position shown in FIG. 4 upon removal of the funnel 180.

Figure 7:
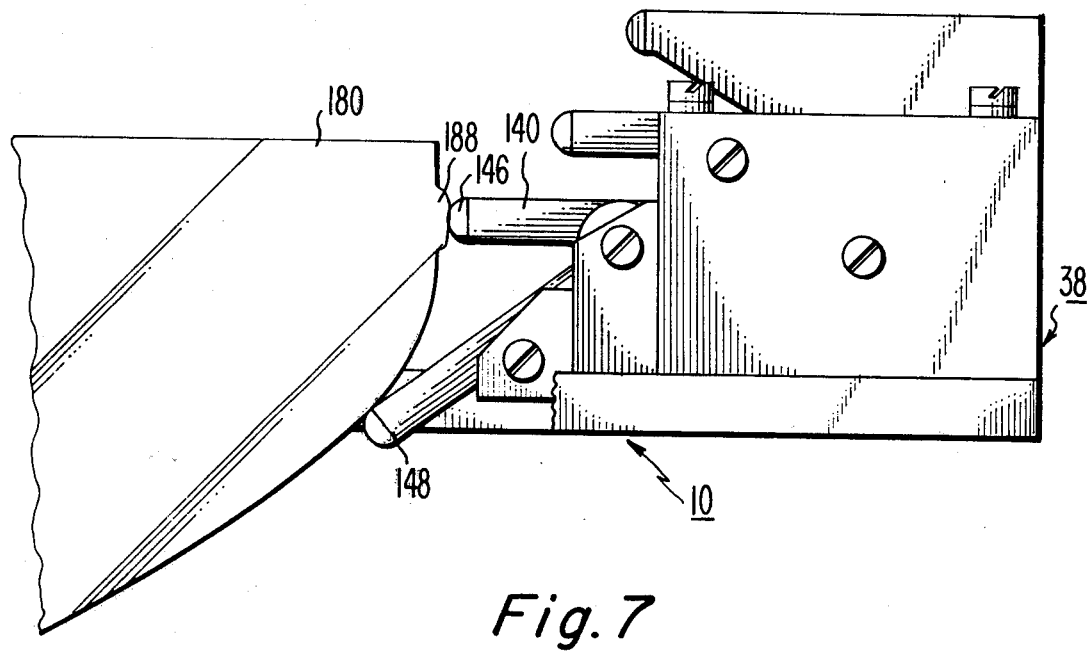
FIG. 7 is a side elevational view of a portion of the article positioning apparatus showing the relationship of the third largest funnel portion to the third locator assembly.
Figure 8:
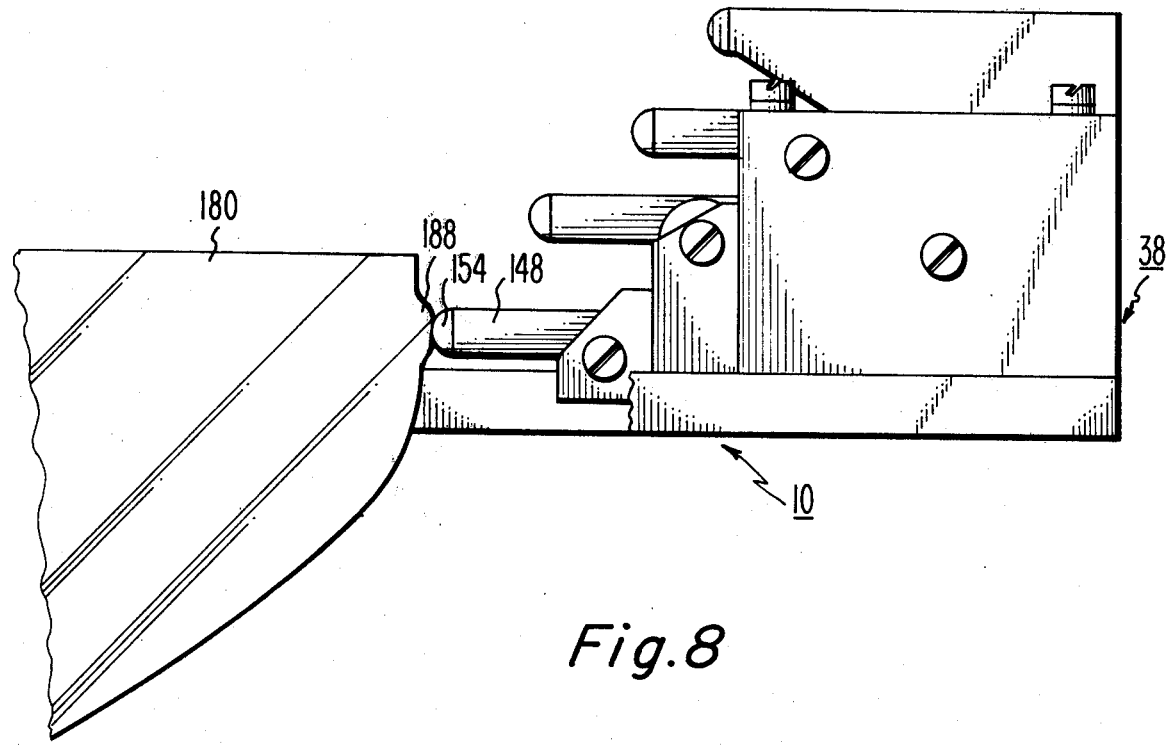
FIG. 8 is a side elevational view of a portion of the article positioning apparatus showing the relationship of the smallest funnel portion to the third locator assembly.

FIG. 7 shows the configuration of the third locator assembly 38 when the third largest funnel portion 180 is inserted in the article positioning apparatus 10 of the present invention. As shown in FIG. 7, the reference pad 188 of the funnel portion 180 engages the engaging pad 146 of the second pivoted locator 140 in the third locator assembly 38. The reference pad 188 is held against the engaging pad 146 by the second pneumatic cylinder 162 (see FIG. 5). In addition, insertion of the third largest funnel 180 causes the third pivoted locator 148 to pivot from its engaging position, as shown in FIG. 4, to a non-interfering, standby position as shown in FIG. 7. FIG. 8 shows the configuration of the third locator assembly 38 when the smallest funnel portion 180 is inserted in the article positioning apparatus 10. As shown in FIG. 8, the reference pad 188 of the funnel 180 engages the engaging pad 154 of the third pivoted locator 148 and is held in contact therewith by the second pneumatic cylinder 162 (see FIG. 5).

Since the locator assemblies 14(a), 14(b) and 38 of the preferred embodiment shown in FIG. 1 each have four locators, this embodiment of the article positioning apparatus 10 can position four different size funnels. The number of locators in each locator assembly depends upon the number of different size articles it is desired to position using the apparatus. For example, two different size articles will require two locators for each locator assembly; three different size articles will require three locators per locator assembly; five different size articles will require five locators per locator assembly; and so on. The ratio of pivoted locators to fixed locators in each locator assembly will be a function of the shape of the articles to be positioned. For example, in the preferred embodiment shown in FIG. 1, the first 14(a) and second 14(b) locator assemblies have two fixed and two pivoted locators each, while the third locator assembly 38 has one fixed and three pivoted locators. This particular configuration is made possible due to the shape of the funnel portion 180 wherein insertion of the largest funnel would not interfere with fixed locators for engaging the A and B reference pads of the next largest funnel. Also, the shape of the funnel is such that insertion of the largest funnel would interfere with fixed locators for engaging the C pad; consequently, all locators but one are required to be pivoted in the third locator assembly 38.

The primary advantage of the apparatus of the present invention is that only one apparatus is required to position a plurality of different size articles. Consequently, when employed with a device such as a funnel ring assembly machine, it becomes unnecessary to retool the machine each time it is desired to place funnel rings on different size television picture tubes. Of course, the funnel ring assembly machine is used only as an example to illustrate the versatility of the apparatus of the present invention. The article positioning apparatus disclosed herein may be used with equal effectiveness in conjunction with any machine or device that requires an article to be accurately positioned for its operation.

I claim:

1. An apparatus for positioning articles of at least two different sizes, each size article having at least three locating points defining a reference plane, said apparatus comprising:
   a. a frame having an opening therein;
   b. means for supporting said articles to be positioned such that the reference plane of each size article is maintained at a predetermined position with respect to said frame; and
   c. at least three locator assemblies mounted on said frame around the periphery of the opening therein in predetermined spaced relation to each other, each locator assembly comprising at least two locators, at least one of which is moveable, independent of the other locator in said locator assembly, to a non-interfering standby position, the moveable locator of each locator assembly lying in the same plane and adapted to engage the locating points on the smallest size article to be positioned, and another locator lying in a plane different from that of said moveable locators and adapted to engage the locating points of a larger size article to be positioned.

2. An apparatus in accordance with claim 1 wherein said moveable locator comprises a finger-like structure having a longitudinal axis and a pivot axis which is orthogonal to and offset from said longitudinal axis such that application of an engaging force along said longitudinal axis causes said finger-like structure to rotate about said pivot axis in a first direction until a rotation stop is engaged and application of a displacing force imparted by positioning a larger size article causes said finger-like structure to rotate about said pivot axis in a direction opposite said first direction, and means for maintaining said finger-like structure in engaging relationship with said stop absent application of said displacing force.

3. An apparatus in accordance with claim 2 comprising engaging means fixed to said frame for exerting a force on the article to be positioned in order to maintain the reference surfaces of said article in contact with the corresponding locators.

4. An apparatus in accordance with claim 3 wherein said means for maintaining said finger-like structure in engaging relationship with said stop comprises a counter balance structure which, under the influence of gravity, rests against said stop.

5. An apparatus in accordance with claim 4 wherein said engaging means comprises at least one pneumatic cylinder.

6. An apparatus in accordance with claim 5 wherein each locator assembly comprises four finger-like locators.

7. An apparatus in accordance with claim 6 wherein each locator assembly comprises at least one fixed finger-like locator.

8. An apparatus in accordance with claim 6 wherein each locator assembly comprises four moveable finger-like locators.

9. An apparatus for positioning four different size funnel portions of television picture tubes, each size funnel portion having locating surfaces defining a reference plane, said apparatus comprising;
   a. a C-shaped frame;
   b. support means fixed to said frame for supporting said different size funnel portions such that the reference plane and locating surfaces of each size funnel portion is maintained at a predetermined position with respect to said frame;
   c. three locator assemblies mounted on said c chaped frame around the periphery of the opening therein in predetermined spaced relation to each other;
   d. a first set of three pivoted locators for engaging the three locating surfaces of the smallest size funnel to be positioned, said first set including one pivoted locator mounted in each of the three locator assemblies such that positioning a larger size funnel portion on said apparatus causes each of the pivoted locators in the first set to pivot from an engaging position to a non-interfering standby position and removing said funnel portion permits the pivoted locators to return to said engaging position;
   e. a second set of three pivoted locators for engaging the three locating surfaces of the next larger size funnel to be positioned, said second set including one pivoted locator mounted in each of the three locator assemblies such that positioning a larger size funnel on said apparatus causes each of the pivoted locators in the second set to pivot from an engaging position to a non-interfering standby position and removing said funnel portion permits the pivoted locators to return to said engaging position;
   f. a first set of locators for engaging the three locating surfaces of the third largest size funnel to be positioned, said first set including one fixed locator mounted in a first locator assembly, one fixed locator mounted in a second locator assembly and one pivoted locator mounted in a third locator assembly, the fixed locators being mounted such that they do not interfere with the positioning of the largest size funnel portion and the pivoted locator being mounted such that positioning the largest size funnel portion causes the pivoted locator to pivot from an engaging position to a non-interfering standby position and removing said funnel portion permits the pivoted locator to return to said engaging position;
   g. a second set of locators for engaging the three locating surfaces of the largest size funnel portion to be positioned, said second set including one fixed locator mounted in each of the three locator assemblies; and
   h. engaging means comprising a first pneumatic cylinder mounted on said frame substantially opposite the opening from the first and second locator assemblies, and a second pneumatic cylinder mounted on said frame substantially opposite the opening from said third locator assembly.

10. An apparatus in accordance with claim 9 wherein all locators are pivoted.

* * * * *

UNITED STATES PATENT OFFICE
CERTIFICATE OF CORRECTION

PATENT NO. : 3,990,692

DATED : November 9, 1976

INVENTOR(S) : Philip Wolever Wolverton

It is certified that error appears in the above-identified patent and that said Letters Patent are hereby corrected as shown below:

In the Abstract, line 7, "engaing" should read --engaging--. Column 3, line 7, after 68b, insert --is--; and in line 49, change "fraame" to --frame--.
Column 4, line 37, change "52(a" to --52(a)--.
In column 5, line 37, change "supporot" to --support--.
Claim 9, column 8, line 20, change "c chaped" to --C-shaped--.

Signed and Sealed this

First Day of February 1977

[SEAL]

Attest:

RUTH C. MASON
*Attesting Officer*

C. MARSHALL DANN
*Commissioner of Patents and Trademarks*